United States Patent [19]

Stine

[11] 4,033,465

[45] July 5, 1977

[54] PIPE HANDLING SYSTEM FOR VESSELS

[75] Inventor: Joe C. Stine, Houston, Tex.

[73] Assignee: Houston Systems, Inc.

[22] Filed: May 20, 1974

[21] Appl. No.: 471,215

[52] U.S. Cl. .............................. 214/13; 214/1 PA; 61/108
[51] Int. Cl.² ..................................... B63B 35/30
[58] Field of Search ............. 214/1 PA, 13, 1 P, 12, 214/1 PB, 2.5; 61/72.1, 72.3; 212/3, 18; 294/74, 81 R, 67 DC, 67 C, 1.19

[56] References Cited

UNITED STATES PATENTS

| 2,268,693 | 1/1942 | Boyer | 214/130 C |
| 3,069,026 | 12/1962 | Aluise | 214/15 R X |
| 3,261,176 | 7/1966 | Puretic | 214/13 |
| 3,294,185 | 12/1966 | O'Neill et al. | 214/2.5 |
| 3,825,129 | 7/1974 | Beck | 214/2.5 |
| 3,837,698 | 9/1974 | Foster | 294/81 R |

Primary Examiner—L. J. Paperner
Assistant Examiner—Kenneth Noland
Attorney, Agent, or Firm—Pravel, Wilson & Gambrell

[57] ABSTRACT

A pipe handling system mounted on a pipe laying vessel for moving pipe from the hold of the vessel into the decks in position for attachment as part of underwater pipeline.

8 Claims, 14 Drawing Figures

PIPE HANDLING SYSTEM FOR VESSELS

BACKGROUND OF THE INVENTION

The field of this invention is pipe handling systems and in particular, a system for handling pipe on a vessel.

Vessels, both barges and ships, for laying an underwater pipeline are known. Generally, such vessels include a pipe laying station on the deck where pipe lengths are successively attached to the portion of the pipeline already laid, the ship simply moving forwardly each time a pipe length is attached to the pipeline so that the pipe laying station is free to receive another pipe length for attachment to the pipeline.

Since the pipeline is to be under water, the pipe lengths are in most cases weight-coated with concrete or the like before they are placed on the vessel. Thus, each pipe length, which may for example be 60 feet long and 5 foot in diameter, is extremely heavy. It is desirable to use pipe laying vessels with large hold so that large numbers of pipe lengths can be stored. A problem with storing pipe lengths below deck is the difficulty encountered in raising such heavy pipe lengths out of the hold and into position on the deck while the ship may be moving in pitch, roll and yaw due to the forces exerted by wave action.

SUMMARY OF THE INVENTION

It is an object of this invention to provide a new and improved pipe handling system particularly for use on ocean going vessels for moving pipe from storage below deck up onto the deck and into position for attaching such pipe to an underwater pipeline which is being laid. The pipe handling system of the preferred embodiment of this invention is capable of transferring pipe lengths stored in the hold of the ship or vessel upwardly onto the deck and into position for attachment to an underwater pipeline in spite of the vessel's movement due to wave action.

The pipe handline system of the preferred embodiment of this invention includes a pipe laying station positioned on the deck of the vessel for successively joining pipe lengths to the underwater pipeline being formed. An overhead crane means is mounted in the vessel hold for removing successive pipe lengths from a stored position in the hold and moving such pipe lengths into a position of alignment with the hatch. Elevator means is mounted in the vessel hold below the deck opening for receiving pipe lengths from the overhead crane means and raising such pipe lengths upwardly through the hatch onto the vessel deck. A first conveyor means mounted on the vessel deck receives the pipe lengths from the elevator means and moves the pipe length longitudinally of the vessel to a second conveyor means which receives the pipe from the first conveyor means and moves the pipe transversely of the vessel onto the pipe laying station.

The overhead crane means of this invention includes a mobile main frame assembly mounted in the hold of the vessel and first and second pipe lifting units mounted onto the mobile frame assembly for independent movement. Each of the pipe lifting units includes a lift means for raising and lowering the pipe within the vessel hole while supporting the pipe against undesired sway in response to movement of the vessel caused by wave action.

Each of the lift means for the pipe lifting unit includes first and second interconnected and expandable linkages which are suspended from a mobile chassis mounted onto the frame assembly. The first and second expandable linkages each comprise a plurality of pivotally interconnected link arms. Further, the first and second expandable linkages are connected to each other for simultaneous movement. The pivotal interconnection within each of the linkages and the connection of the linkages together provide the joined linkages with sufficient support to resist lateral or horizontal forces or movement which might otherwise occur due to the movement of the vessel.

Additional objects of this invention and additional features of this invention will be described and claimed hereinafter.

DESCRIPTION OF THE PREFERRED EMBODIMENT

Figure 1:
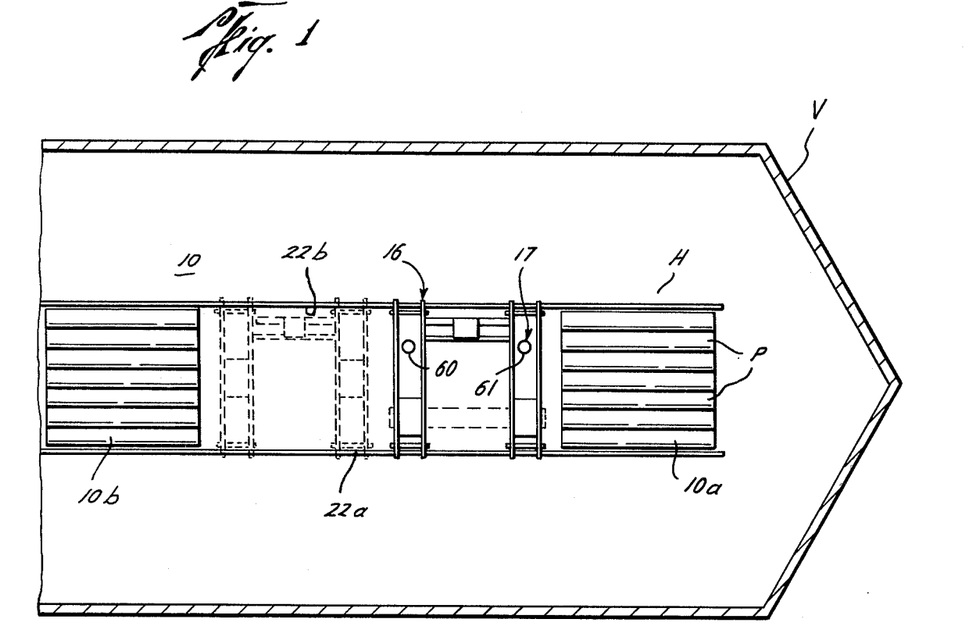
FIG. 1 is a top view of the vessel with the deck portion removed in order to expose the vessel hold and the overhead crane assembly of this invention.
Figure 2:
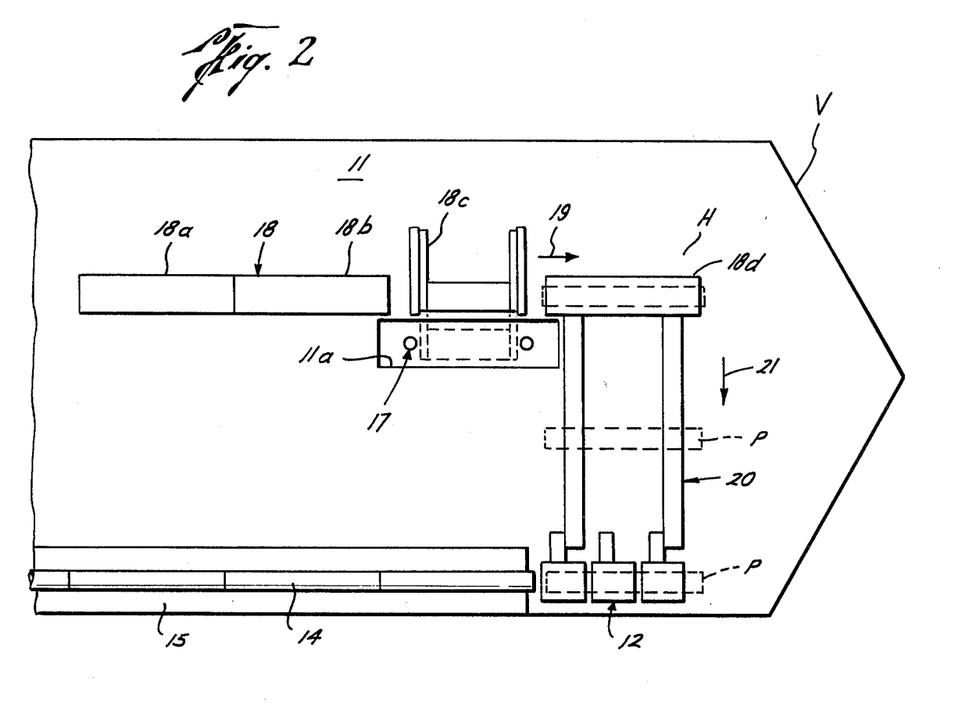
FIG. 2 is a top view of the vessel deck illustrating the pipe handling system for handling the pipe after it has been raised to the deck.

Referring to the drawings and in particular to FIGS. 1 and 2, a pipe handling system H for ocean going vessel V is provided for moving pipe lengths individually or collectively designated as P from the storage area of the vessel hold 10 onto the vessel deck 11 and into position on pipe laying station 12. The pipe laying station 12 receives the pipe lengths P for alignment with underwater pipeline portion 14 which has already been formed. As is well known, the underwater pipeline portion 14 extends downwardly into the water along a sloped ramp 15.

In the vessel hold, pipe lengths P may be stored in the bow area at 10a and in the stern area at 10b. The pipe lengths P may be extremely long such as 60 feet and may be extremely large in diameter such as 5 feet. In addition, each pipe length is weight-coated with concrete or other suitable material to ensure that the pipeline will rest firmly on the ocean bottom. Due to the tremendous size and weight of lengths P, they are bulky and difficult to handle.

The pipe handling system H of the preferred embodiment of this invention basically includes an overhead crane means 16 mounted in the vessel hold 10 for removing the pipe lengths P from the storage areas, 10a and 10b into a position of alignment with hatch 11a. From that position, elevator means generally designated as 17 receive the pipe lengths and raise the pipe lengths upwardly through the hatch and onto the vessel deck 11. A first conveyor means 18 receives the pipe lengths P from the elevator means 17 and moves the pipe length longitudinally of the vessel, from aft to fore, (in the direction of arrow 19) to a position of alignment with a second conveyor means 20. The second conveyor means 20 receives the pipe from the first conveyor means 18 and moves the pipe transversely (athwart) of the vessel V, from port to starboard in the direction of arrow 21 to the pipe laying station 12.

The overhead crane means 16 mounted in the vessel hold 10 includes a mainframe assembly generally designated as 22 for mounting the overhead crane means 16 for movement between the fore and aft storage areas 10a and 10b of the pipe. The frame assembly 22 includes two main tracks 22a and 22b which extend longitudinally of the vessel V and are mounted at a suitable height above the pipe storage areas 10a and 10b by any suitable mounting frame schematically designated as 23. The main tracks 22a and 22b are I-beams having rack gears 22c and 22d, respectively, mounted on top and extending the length thereof. In addition, the track 22a includes an inside track portion 22e mounted at the bottom of the I-beam and extending the length of the beam; and, the track 22b includes a similar inside portion track 22f mounted on the inside and at the bottom of the beam and extending the length thereof.

Figure 3:
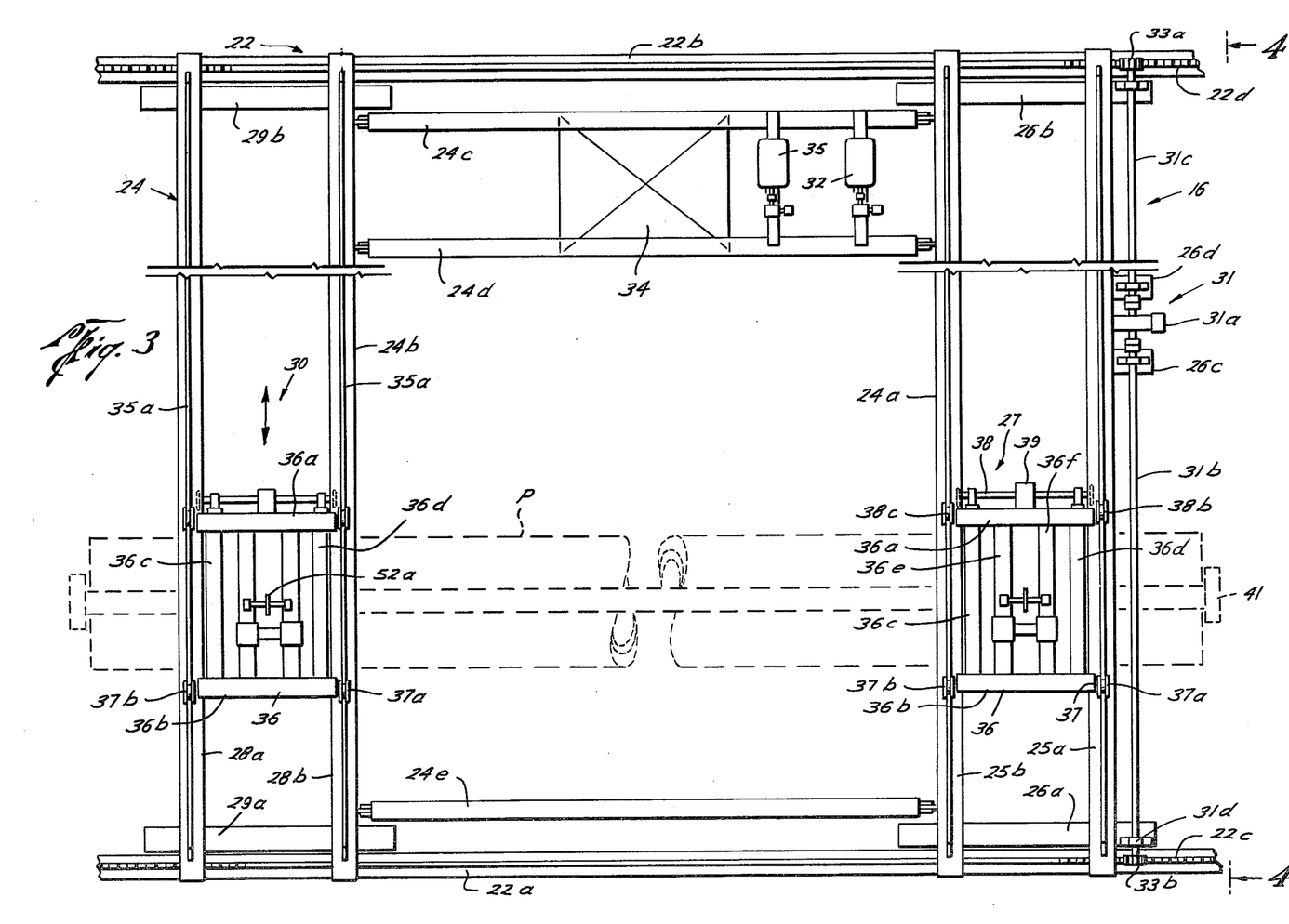
FIG. 3 is a top view of the overhead crane system.
Figures 4, 5, 7:
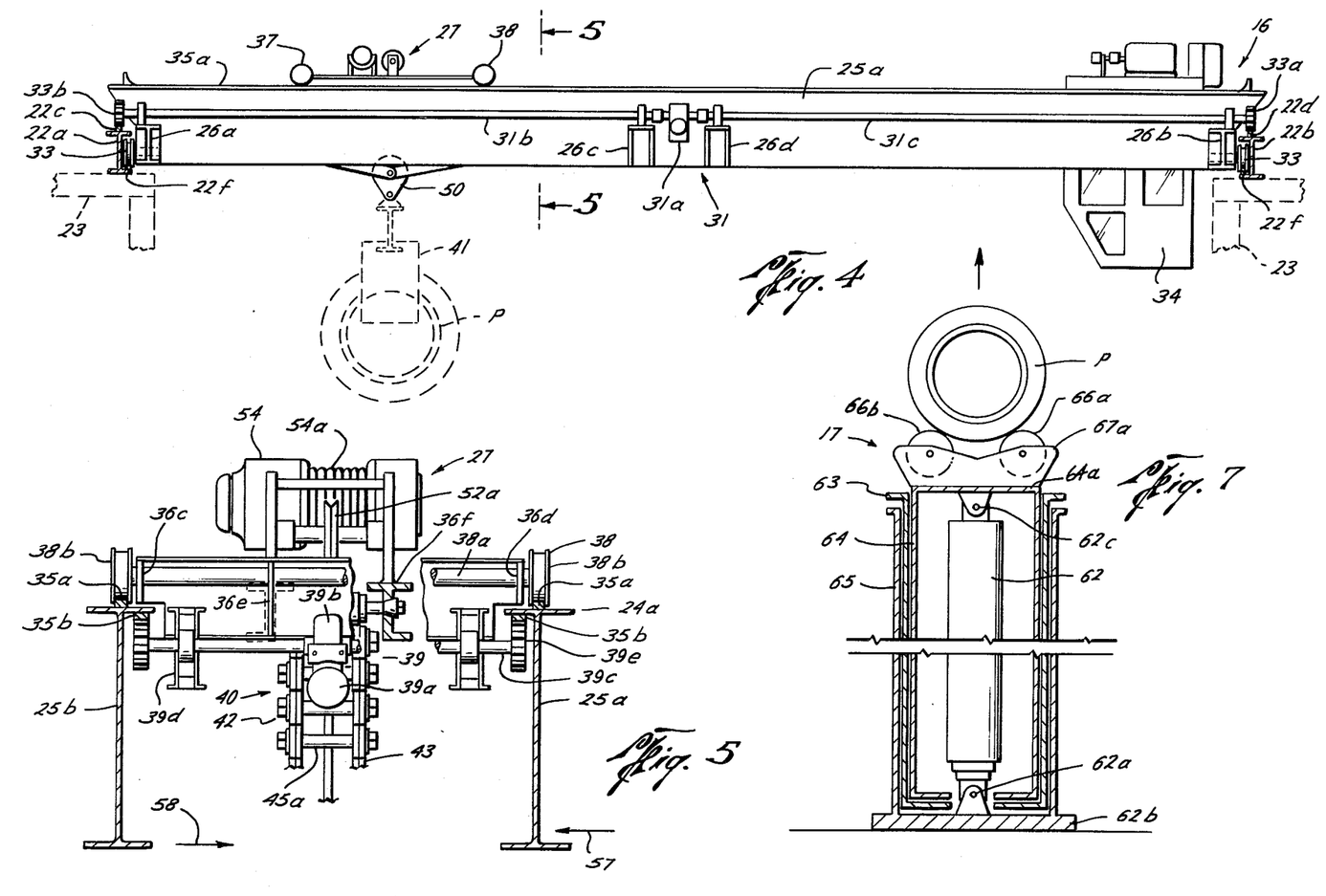
FIG. 4 is an end view taken along line 4—4 of FIG. 3.
FIG. 5 is a sectional view taken along line 5—5 of FIG. 4 illustrating the chassis and lift linkage of one of the pipe lifting units.
FIG. 7 is a partly sectional view of one of the elevator stations for raising the pipe from the hold onto the vessel deck.

The main frame assembly 22 further includes the main, mobile frame unit 24 which is mounted onto the main tracks 22a and 22b for movement longitudinally within the vessel hole 10. The main mobile frame unit 24, as illustrated in FIGS. 1, 3 and 4, is generally of a square configuration and includes fore and aft track sections 24a and 24b, respectively, interconnected by frame members 24c, 24d and 24e. The fore or front track section 24a includes two spaced I-beams 25a and 25b which extend between the main tracks 22a and 22b. The fore track beams 25a and 25b are joined by frame members 26a and 26b by any suitable means such as welding.

A movable lift unit generally designated as 27 is mounted for independent movement along the fore track beams 25a and 25b.

The aft track section 24b is formed of spaced I-beams 28a and 28b which extend between the main track member 22a and 22b and are joined by frame members 29a and 29b which are welded or otherwise connected therebetween. The aft track section 24b has mounted thereon aft lifting unit generally designated as 30 mounted for independent movement along the aft section beams 28a and 28b. The fore and aft or tandem lifting units 27 and 30, respectively, cooperate to provide a lifting means for lifting pipe lengths P upwardly from either of the storage areas 10a and 10b and moving the pipe lengths P into position at the elevator means 17 while supporting the lift units 27 and 30 against stresses that may be caused by the movement of the vessel, which movement may cause the heavy pipe lengths to exert tremendous stress on the lift units 27 and 30.

The interconnecting frame members or beams 24c, 24d, and 24e are pivotally connected to the fore and aft track sections 24a and 24b so that the entire main mobile frame unit 24 moves as a single unit along the main track members 22a and 22b longitudinally, between fore and aft sections of the vessel hole 10.

Referring in particular to FIGS. 3 and 4, a main drive generally designated as 31 is mounted onto the fore track beam 25a for moving the entire overhead crane means 16 fore and aft of the vessel hold 10. The main drive 31 includes a main hydraulic motor 31a mounted onto the fore track member 25a for driving drive shafts 31b and 31c. The drive shafts 31b and 31c are mounted for rotation adjacent to the fore track member 25a by a suitable pillow block bearings such as 31d, which are mounted onto frame members 26a, 26b and onto supports 26c and 26d which extend outwardly from the track member 25a. The drive shafts 31b and 31c are thus mounted for rotation and are driven by the hydraulic motor 31a, which is powered from a suitable hydraulic pump 32 mounted on the interconnecting beams 24c and 24d. Each of the drive shafts 31b and 31c terminate in pinion gears 33a and 33b, respectively, which engage the rack portions 22d and 22c, respectively, such that rotation of the shafts 31b and 31c propels the entire overhead crane means 16 from fore to aft; and aft to fore (longitudinally) of the vessel hold 10.

Referring to FIG. 4, it should be noted that the frame members 26a and 26b which connect the fore track members 25a and 25b, have mounted thereon wheels 33 by suitable means, which wheels 33 engage the inside tracks 22e and 22f on the main track members 22a and 22b, respectively. Similarly, wheels such as 33 are mounted onto the outside of the connecting members 29a and 29b of the aft track section 24b for rollably engaging the tracks 22e and 22f and providing further support for the entire main mobile frame unit 24 during movement longitudinally of the vessel hole 10.

An operator cab 34 of suitable design is suspended from the connecting frame members 24c and 24d and contains the proper hydraulic controls for operating the entire overhead crane means 16. A second hydraulic pump 35 is mounted onto the frame members 24c and 24d adjacent the first-mentioned hydraulic pump 32 in order to provide hydraulic power to the aft lifting unit 30 separate from the hydraulic power provided to the fore lifting unit 27 and to the main drive 31, which is powered by the first-mentioned hydraulic pump 32.

The track members 25a and 25b for the fore track section 24a each has a track portion 35a mounted on the top thereof. Further, each track member 25a and 25b has a rack gear 35b mounted underneath the top beam portion. Similarly, the track members 28a and 28b of the aft track section 24b includes a track portion 35a on the top thereof and a rack gear mounted underneath.

The fore lift unit 27 is basically identical to the aft lift unit 30 and thus like numbers and letters will be used to describe like parts. Referring to FIGS. 3, 4, 5, and 6a and 6b, the number 36 generally designates a mobile chassis which is mounted onto the track beams 25a and 25b. The mobile chassis 36 is formed by four frame members 36a, 36b, 36c and 36d. Chassis frame members 36a and 36b are I-beams and frame members 36c and 36d, which interconnect the frame members 36a and 36b, may be I-beams or other suitable beams. A roller support assembly 37 is mounted with chassis frame member 36b and includes wheels 37a and 37b which engage the track portions 35a on the fore track sections beams 25a and 25b, the wheels 37a and 37b being supported for rotation by shaft 37c. A second roller assembly 38 is mounted with the chassis frame members 36a, 36c and 36d and includes a shaft 38a which extends between the side chassis frame members 36c and 36d, the shaft 38a having rollers 38b and 38c mounted thereon for engagement with the track portions 35a on the aft track section means 25a and 25b.

A chassis drive generally designated as 39 is mounted onto chassis frame member 36a. The chassis drive 39 includes a hydraulic motor 39a mounted with a gear assembly 39b, both of which are mounted onto the chassis frame member 36a. The hydraulic motor 39a is connected by suitable hydraulic connections to the hydraulic pump 32 (the chassis drive 39 for the aft lift unit 30 being connected by suitable hydraulic connections to the hydraulic pump 35). A shaft 39c is mounted by pillow block bearings 39d onto the chassis frame member 36a. A pinion gear 39e is mounted at each end of the shaft member 39d, the pinion gear 39 being positioned for engagement with the rack portions 35b on the underside of each of the track section beams 25a and 25b. Thus, the entire chassis 36 for the lift means 27 traverses the force track section members 25a and 25b by activation of the hydraulic motor 39a from the control cab 34. Similarly, the chassis 36 for the lift means 30 is moved aong the beam 28a and 28b for the aft track section 24b by an identical chassis drive 35 mounted therewith.

Each of the fore and aft lift units 27 and 30 further include an expandable lift linkage generally designated as 40 for raising and lowering the pipe lengths P. The expandable lift linkage 40 is adapted to have mounted therewith any suitable type of pipe gripping device such as 41 which is illustrated schematicaly only (FIG. 3) since it does not form part of this invention. The expandable lift linkage mounted on each of the pipe lift units 27 and 30 is provided for raising pipe lengths P upwardly from the storage areas such as 10a or 10 b in the vessel hole 10 to a raised position above the elevator means 17. The expandable lift linkage 40 for each lift unit 27 and 30 raises the pipe lengths P in substantially a straight line without deviation due to the stress placed on the vessel from the undulating forces caused by the ocean. The expandable lift linkages 40 are identical for each of the pipe lift units 27 and 30 and again like numbers and letters will be used to describe like parts.

The expandable lift linkage 40 includes two separate linkges 42 and 43 which are suspended from chassis frame members 36e and 36f of each lift unit 27 and 30. The chassis frame members 36e and 36f are I-beams which extend between the chassis frame members 36a and 36b. Each of the chassis frame members 36e and 36f includes two transverse sots 44a and 44b.

Figure 6A:
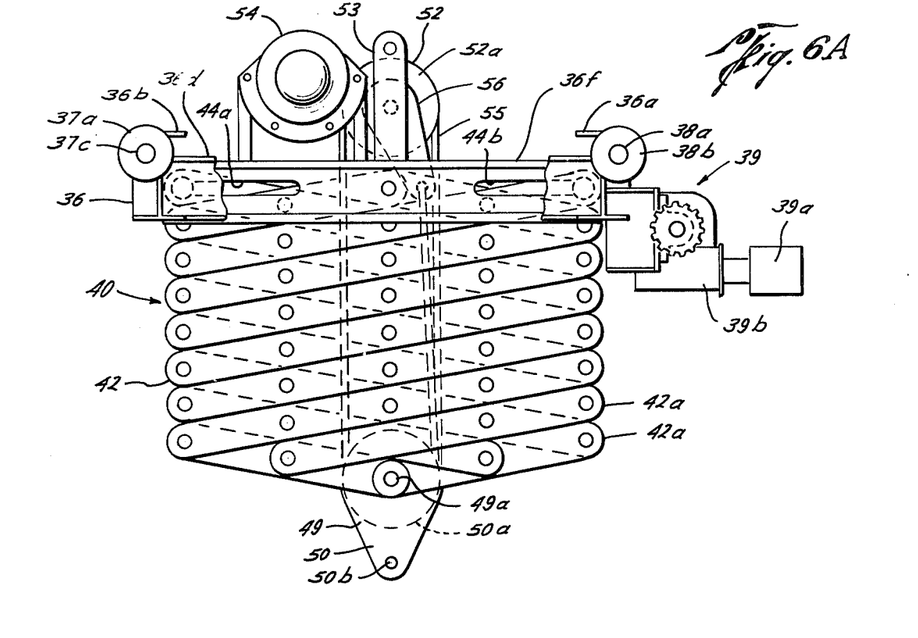
FIG. 6a is a side view of one of the lift units illustrating the lift linkage in a raised, contracted position.
Figure 6B:
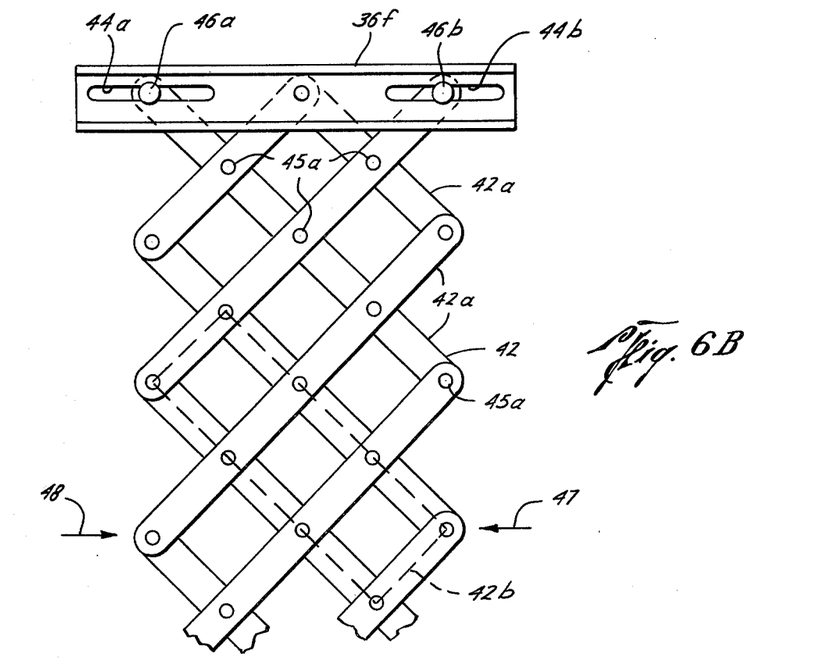
FIG. 6b is a side view illustrating the lift linkage in an expanded, lowered position.

The expandable lift linkage 42 is comprised of a series of link arms 42a which are interconnected by a plurality of pivotal interconnection pins 45a. In the embodiment of the invention illustrated in the drawings, the two top link arms 42a have mounted therewith support pins 46a and 46b which extend through the transverse slots 44a and 44b, respectively, for mounting the entire linkage 42 for movement between the raised or contracted position illustrated in FIG. 6a and the lowered or expanded position illustrated in FIG. 6b. The combination of pivotal connections by pins 45a on each link arms provide for a pivotal interconnection of all the link arms in each lift linkage. In the raised or contracted position, the link arms 42a are in two sets, the first set being illustrated in real lines in FIG. 6 and the second set being illustrated in imaginery lines in FIG. 6, each link arm of each set being parallel. Whenever the linkage 42 is lowered to the expanded position, the link arms form a plurality of parallelagrams such as illustrated schematically at 42b in FIG. 6b. One of the advantages of using such interdependent linkages as 42 is that the pivotal interconnection pins 45a and the top support pins 46a and 46b serve to support the entire linkage 42 against lateral displacement in the directions of either arrows 47 or 48 when the linkage 42 is subjected to stress in either of these directions. The transverse slots 44a and 44b, allow the support pins 46a and 46b to move inwardly towards each other when the linkage 42 is in a lowered position (FIG. 6b ) and to move outwardly when the linkage is in a raised position (FIG. 6a).

The separate linkage 43, illustrated in FIG. 5, is identical to linkage 42 but is suspended from the frame member 36f in transverse slots identical to those described with respect to the frame member 36e. Thus the separate linkages 42 and 43 are separated by the approximate distance between the support frame members 36e and 36f. The pivotal connection pins 45a illustrated in FIG. 3 are actually pins or bolts which extend through not only the link members 42a for the linkage 42, but also through the link members 42a forming the linkage 43 so that the same pins or bolts provide the pivotal interconnection for each of the separate linkages 42 and 43. In this manner, the separate linkages are mounted for simultaneous movement between the raised and lowered positions described herein. Further, the common pins 45a serve to support the combined linkages against lateral or horizontal movement in direction of arrows 57 and 58.

A bottom pulley assembly 50 which may include two pulleys or sheaves 50a is mounted by center, bottom pin 49a between the separate linkages 42 and 43. Attachment plates such as 50b may also be mounted by the pin 49a so that the pipe length gripping means 41 or other suitable gripping means can be attached to the spearate linkages 42 and 43 for movement therewith.

A top pulley assembly 52 may include a single sheave or pulley 52a mounted above and between chassis frame members 36e and 36f by brackets such as 53. A hydraulic motor 54 is mounted onto the chassis frame members 36e and 36f adjacent to the top pulley assembly 52. The hydraulic motor 54 is suitably connected back to the controls in the cab and further includes a winding reel 54a having mounted thereabout a wireline 55, which wireline extends about one of the bottom pulleys 50a and upwardly about the top pulley 52a and then around the second bottom pulley (not shown) and then upwardly into attachment to an anchor plate 56, which anchor plate is attached by suitable means to the top pulley brackets 53. In this manner a winding of the wireline 55 onto the motor reel 54a will cause a lifting or raising up of both of the separate lift linkages 42 and 43 substantially simultaneously. Similarly, an unwinding of the motor reel 54a may cause a lowering of the separate linkages 42 and 43 simultaneously.

It has been noted that the separate linkages 42 and 43 for each of the lifting units 27 and 30 are interconnected by means of the bolts on pins 45a. The pins 45a serve to support and join the separate linkages 42 and 43 for simultaneous movement upwardly and downwardly. The interconnected linkages 42 and 43, which form the expandable lift linkage 40, is supported to resist lateral or horizontal movement in practically any direction. In this manner, the stress due to the moments of force exerted by the heavy pipe lengths P in the rocking vessels are absorbed within the multiple support system of the separate linkages 42 and 43 such that the pipe lengths P can be raised even though the boat is being moved about in pitch, roll or yaw.

The hydraulic motor 54 and pulley assembly formed by bottom pulley assembly 50 and top pulley 52 cooperate to raise the separate linkages 42 and 43 and the pipe length P connected therewith through a suitable gripping means such as 41 upwardly to the raised position illustrated in FIG. 6a (see also FIG. 7). After the pipe length P has been placed onto the elevator means 17, the pressure on the fluid motor 54 is released to allow the linkages 42 and 43 to lower to the lowered position under their own weight.

It should be noted that the mounting of the lift means 27 and 30 for separate, independent movement on fore and aft track sections 24a and 24b, allows the units to be moved to a skewed position with respect to each other for the purposes of aligning the expandable lift linkages 40 on each unit with a pipe length P which is in a skewed position with respect to the pipe racks 10a and 10b. In this manner, a pipe length P can be picked up even though it has fallen or otherwise come to rest in something other than the normal position illustrated in FIG. 1.

The elevator means which has been designated as 17 is illustrated in FIGS. 1, 2, and 7 in particular. The elevator means includes 2 elevator stations 60 and 61 which are positioned under the hatch 11. The elevator stations 60 and 61 are basically identical except for position and thus only the elevator station 61 illustrated in FIG. 7 will be described in detail. A telescoping hydraulic lift 62 is pivotally mounted at 62a onto a base 62b in the vessel hold. The telescoping hydraulic lift 62 is of well known construction and includes several telescoping hydraulic piston and cylinder combinations, which under the application of hydraulic fluid under pressure, serve to telescope upwardly. The telescoping hydraulic lift 62 is also pivotally attached at 62c to an upper or top plate 64w. The top plate 64a is the top of a cylindrical casing 64 which is telescopingly mounted within another cylindrical casing 63, which is mounted in a third outer clindrical casing 65. The cylindrical casings 63, 64 and 65 serve to provide support for the entire elevator station 61 as it is moved upwardly to a raised position. Pipe support rollers 66a and 66b are suitably mounted on roller support plates such as 67a in position to receive the pipe length P upon release from the fore and aft mobile lifting units 27 and 30, respectively, of the overhead crane means 16. The elevator stations 60 and 61, through the application of hydraulic fluid under pressure to the telescoping hydraulic lift 62 located in each station, move the pipe length P upwardly out of the vessel hole 10 and above the deck 11.

Referring now to FIGS. 2, 8–11a and 12, the first conveyor means 18 comprises four pipe conveying sections 18a, 18b, 18c and 18d. Pipe conveying sections 18a, 18b, and 18d are mounted in stationary positions on the vessel deck 11. The pipe conveying sections 18a, 18b and 18d are basically identical in structure and thus the description of the basic pipe conveying section 18d will provide an enabling description also for the pipe conveying sections 18a and 18b.

Figure 11A:
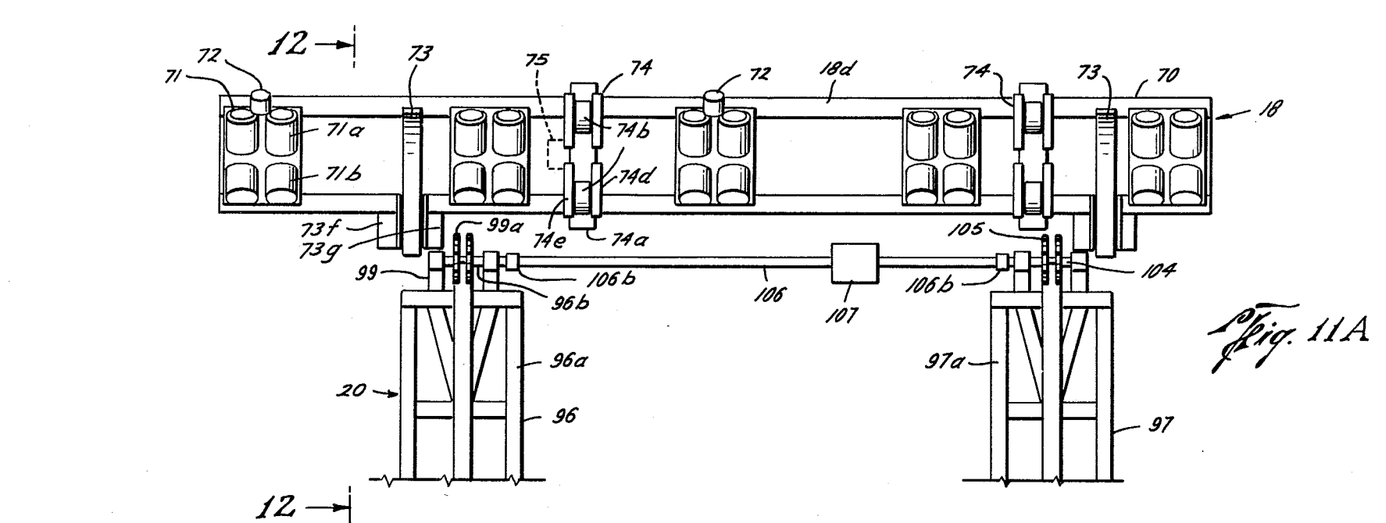
FIGS. 11a and 11b illustrate the first and second conveyor means and the pipe laying station.

Referring to FIG. 11a, the pipe conveying section 18d includes a frame work 70 which is generally rectangular in the configuration as viewed from the top view. A series of five roller assemblies 71 are mounted within the framework 70. Each roller assembly 71 includes opposing sets 71a and 71b of inclined rollers which are suitably mounted to slope downwardly toward each other to form a recessed area to receive the pipe length P. Suitable motor means and gear means generally designated by the number 72 are operably connected with at least one of the sets of rollers such as 71a to cause the individual rollers to rotate in order to propel the pipe length P along the conveyor section 18d. The pipe conveying sections 18a and 18b are basically identical to the pipe conveying section 18d up to this point.

However, in addition to the above elements, the pipe conveying section 18d has several features which may not be found in pipe conveying sections 18a and 18b. Firstly, the pipe conveying section 18d includes two arm lift assemblies generally designated by the number 73. The arm lift assemblies 73 each include a curved lift arm 73a having an inner curved surface 73b with a radius of curvature substantially equal to that of the weight-coated pipe length P in order to receive same. The curved lift arm 73a is pivotally mounted at 73c to platform support members 73e and 73f. A hydraulic actuation cylinder 73d is pivotally connected to the support platform members 73e and 73f and the lift arm 73a itself in order to raise and lower the lift arm through pivotal movement as desired.

The pipe conveying section 18d has also mounted therewith two spin and lift stations 74 which are positioned inside of the hydraulic arm lift assemblies 73. The spin and lift stations each include a column 74a which is suitably mounted for vertical movement upwardly and downwardly with respect to the framework 70. Opposed rollers 74b and 74c are suitably mounted between roller support plates 74d and 74e; and motor and gear means 75 are mounted onto the column 74a in operative engagement with at least one of the rollers such as 74c in order to rotate such roller to cause a pipe length P mounted thereon to rotate. Further suitable power means (not shown) are mounted with the column 74a itself to move such column upwardly and downwardly. Such power means may include a hydraulic lift or any suitably known jacking mechanism to move simultaneously upwardly the column 74a of each of the spin and lift stations 74. In this manner, whenever it is desired to inspect a pipe length P, the column 74a is raised upwardly with the pipe length P thereon sufficient distance to allow an operator to inspect the pipe as it is rotated by the motor and gear means 75.

Figure 8:
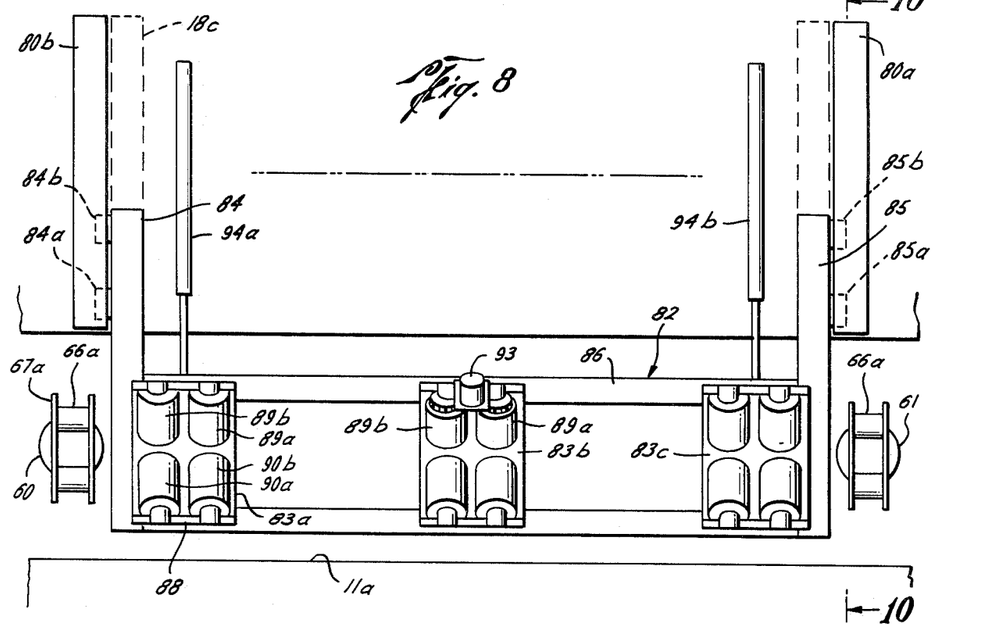
FIG. 8 is a top view of the pipe transfer section for the first conveyor means.
Figure 9:
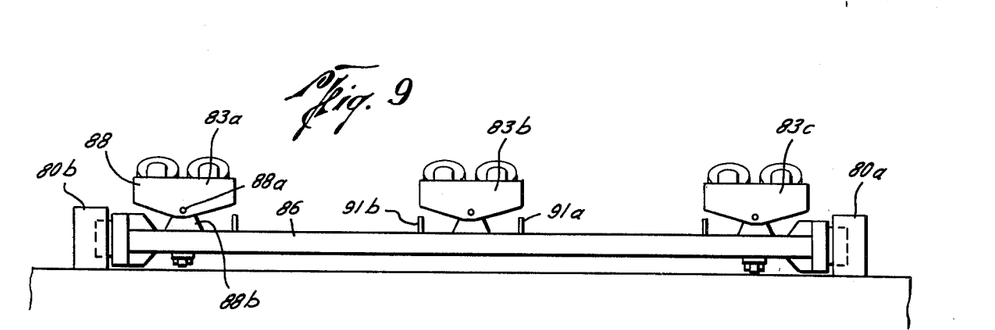
FIG. 9 is a side view of the pipe transfer sections of FIG. 8.

The pipe conveying section 18c of the first conveying means 18 is actually a pipe transfer section for receiving a pipe length P from the elevator stations 60 and 61 and for moving such pipe into a position of alignment with the other pipe conveying sections 18a, 18b, and 18d. The pipe conveying section 18c includes a fixed frame member 80 mounted onto the vessel deck 11 in substantial alignment with the other pipe conveying sections 18a, 18b, and 18c. The fixed or stationary frame member 80 includes opposing track sections 80a and 80b which are basically U-shaped in order to provide upper and lower track surfaces. For example, referring in particular to the stationary frame 80a, an upper track surface 81a and a lower track surface 81b are formed by the stationary frame.

A movable frame generally designated as 82 has mounted thereon three roller assemblies 83a, 83b, and 83c, and is mounted for movement between a position of alignment with the other pipe conveying sections such as 18d and an outward or extended position for picking up a pipe length P from the raised elevator lift stations 60 and 61. The movable frame 82 includes side members 84 and 85 which are joined by a central roller support frame 86, which actually has mounted therein the three roller conveying assemblies 83a, 83b, and 83c.

Figure 10:
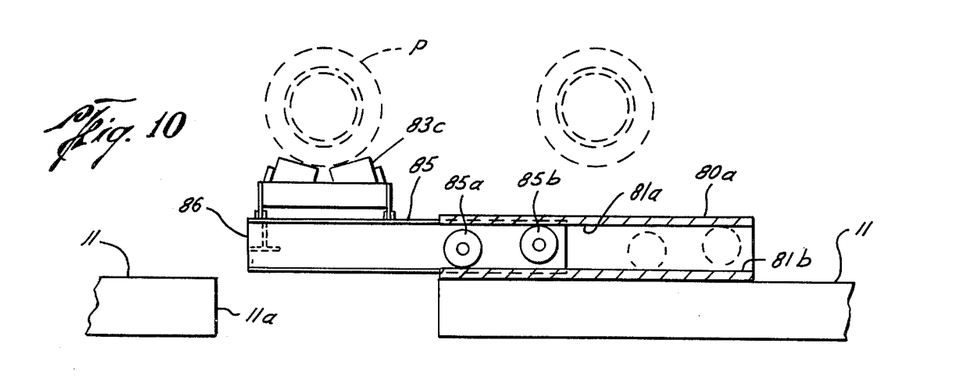
FIG. 10 is an end view in section taken along line 10—10 of FIG. 8 illustrating the mounting of the movable pipe transfer frame section.

The movable side frame member 85 has mounted thereon rollers 85a and 85b. The roller 85a is positioned to continually engage the lower track portion 81b of the stationary frame member 80a; and, the roller 85b is positioned slightly above the roller 85a to continually engage the upper track portion 81a of the stationary frame member 80a. Similarly, the movable side frame member 84 has rollers 84a and 84b which engage the upper and lower track surfaces (not shown) of the stationary side frame member 80b. The rollers such as 85b on the movable side frame member 85 serve to maintain the movable frame 82 in a substantially level position with respect to the deck 11 of the vessel in spite of the tremendous moment force being placed thereon when the movable frame 82 is in the extended position over the hole 11a and has received a pipe length P.

the roller assemblies 83a, 83b and 83c are basically identical and like numbers and letters will be used to describe like parts. Each of the roller assemblies such as 83a includes a roller support frame 88 which is pivotally mounted at 88a by suitable pivotal mounting means onto a base or pedestal 88b which extends from the central frame portion 86. Two rollers 89a and 89b are mounted at a slope on one side of the frame 88a and rollers 90a and 90b are mounted on the other side of the frame 88 and also slope downwardly such that the rollers slope downwardly towards each other to provide a recess to receive the pipe length P. Thus the frame 88 serves to pivotally mount the roller assemblies such as 83a for pivotal movement. Stops 91a and 91b are welded or otherwise attached to the frame 86 to extend upwardly a sufficient distance to serve as stops for the pivotally moving roller assembly 83a. In this manner, the roller assemblies such as 83a may pivot within an angular displacement controlled by the height of the stops 91a and 91b. The pivotal mounting of the roller assemblies 83a, 83b and 83c allows the roller assemblies to engage the surface of a pipe length P in spite of variations in the exterior surface of the pipeline such as due to an uneven application of concrete coating. The roller assembly 83b further includes a motor and gear means 93 which serve to drive the rollers 89a and 89b in order to propel the pipe length P from the movable frame section 18c onto the stationary frame section 18d.

Referring to FIG. 8, the movable frame which has been generally designated as 82 is moved outwardly by hydraulic power cylinders 94a and 94b, which are mounted onto the vessel deck 11, and onto the movable central frame portion 86, to an extended, pick up position between the elevator stations 60 and 61. The elevator stations 60 and 61 are then lowered to the position of FIG. 4 thus allowing the pipe to come to rest on the roller assemblies 83a, 83b and 83c. The hydraulic power cylinders 94a and 94b are then actuated to withdraw the movable frame 82 and the pipe length P back into a position of alignment with the other pipe conveying sections such as 18d so that the pipe length P can be conveyed onto another section such as 18d.

The second conveyor means 20 receives the pipe from the hydraulic arm lift assemblies 73 and conveys the pipe lengths P transversely, port to starboard, to the pipe laying station 12. The second conveyor means 20 is an endless belt type of conveyor especially designed to handle particularly large and heavy pipe lengths P. The second conveyor means 20 includes two conveying sections 96 and 97 which are in approximate alignment with the hydraulic lift arm assemblies 73 on the pipe conveying section 18d. The conveying section 96 includes a rack or frame 96a mounted onto the vessel deck. The frame 96a is generally rectangular and includes sufficient structure to properly mount for rotation an endless conveying belt assembly 98. The endless conveying belt assembly 98 includes an end shaft 96b mounted for rotation at the end of the rack adjacent to pipe conveying section 18d. Any suitable means may mount the shaft 96b for rotation such as the bearing assembly 99 illustrated in FIG. 11a. Similarly, another shaft 96c is mounted for rotation by suitable bearing means 100 at the end of the conveying rack 96 adjacent to the pipe laying station 12.

A gear drive or sprocket 99a are mounted onto the shaft 96b and the gears or sprockets 100a are mounted onto the shaft 100. The gears 99a and 100a engage the endless belt assembly 98 in order to cause the belt to continually rotate or move along the rack in order to carry pipe lengths P thereon from the hydraulic lift arms 73 to the pipe laying station 12. The endless belt assembly 98 is composed of a series of pivotally interconnected links or segments such as 98a, 98b and 98c. The lengths 98b and 98c include inwardly tapered surfaces having mounted thereon pods 101 which serve to receive and secure the pipe lengths P in position. The inwardly tapered surfaces on the belts links 98b and 98c, with the pods 101 mounted thereon, serve to form a recess to receive and secure pipe lengths P. The pivotally mounted links such as 98b and 98c (by any suitable pivotal connectors, which are not shown), better conform to the concave outer surface of the pipe length P. In addition to securing the pipe length P, the pods 101 serve to center and maintain stable the pipe length P in position thereon.

Figure 11B:
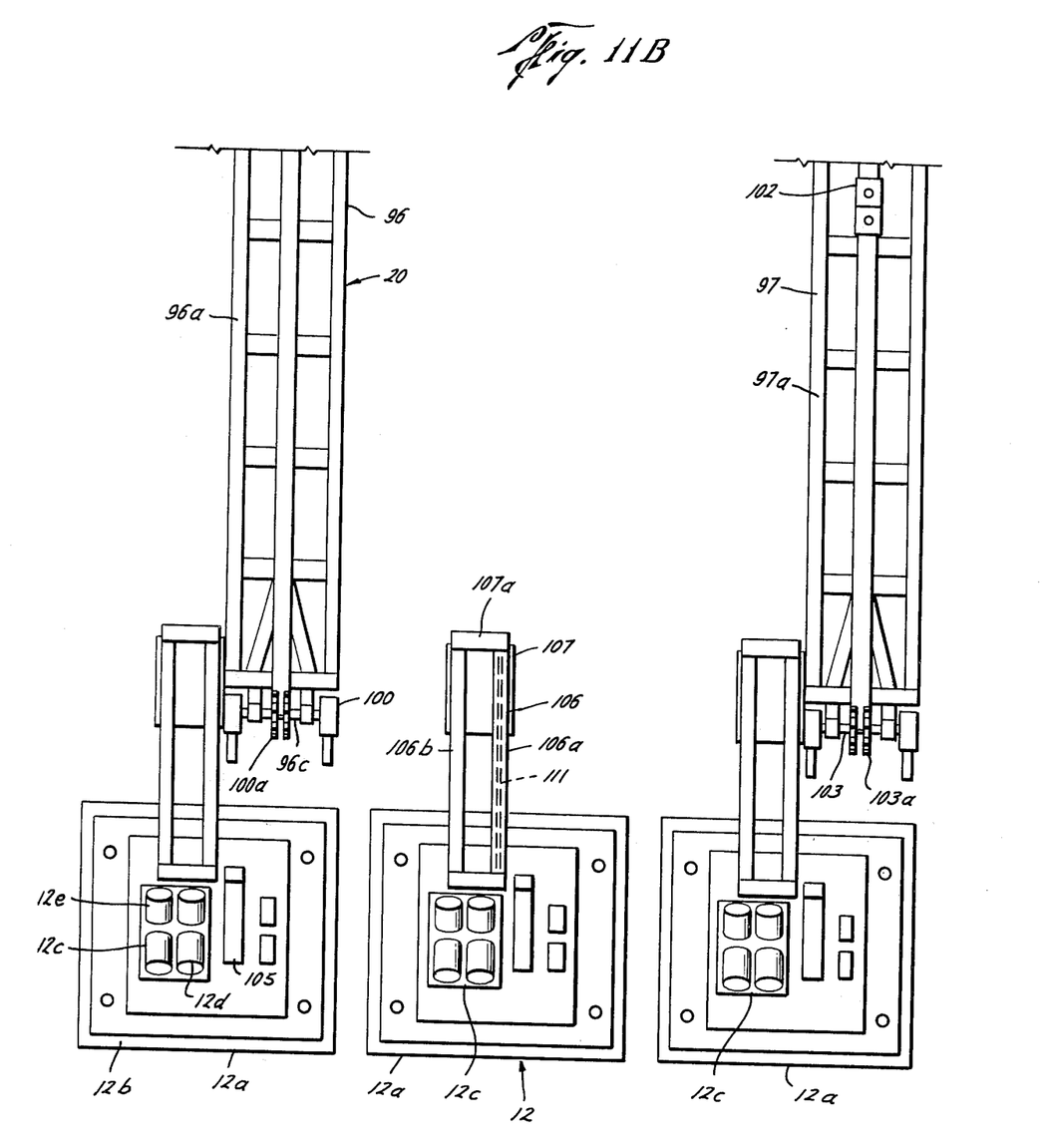
Figure 12:
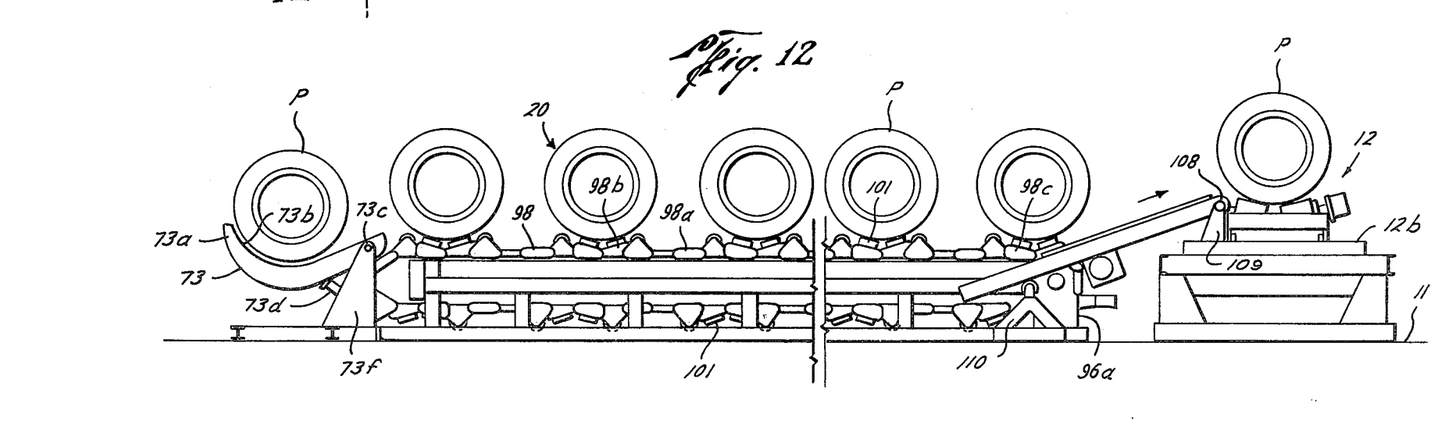
FIG. 12 is a side view taken along line 12—12 of FIGS. 11a and 11b.

The conveying section 97 is basically identical to the conveying section 96 and includes an elongated pipe rack 97a adapted to mount for continuous movement an endless belt assembly 102 of identical structure to the endless belt assembly 98. An end shaft 103 having mounted thereon a gear or sprocket 103a is mounted for rotation at the end of the pipe rack 97a adjacent to the pipe station 12. Similarly, another end shaft 104 having gears or sprockets 105 mounted for rotation therewith is mounted at the end of the pipe rack 97a adjacent to the pipe conveying section 18d. Shafts 96b and 104 are synchronized for simultaneous rotation by means of synchronizing shaft 106 which is connected to the shafts 96b and 104 by couplings 106a and 106b, respectively. A suitable drive mechanism 107, which may be a hydraulic motor and gear arrangement or other suitable drive means, is mounted in driving engagement with the shaft 106 in order to drive both endless belts 98 and 102 at the same rate thereby maintaining pipe lengths P on the endless belt assemblies in a position of substantial alignment with the longitudinal axis of the ship.

The pipe laying station 12 may be any suitable pipe laying station which can receive the pipe lengths P from the dual endless conveyor system of the second conveyor means 20 and maintain the pipe lengths in position for attachment with the underwater pipeline portion 14 which is already assembled. The pipe station 12 consists of three stations 12a which are positioned at the starboard side of the endless conveyor sections 96 and 97. The pipe laying stations 12a each include a base 12b having mounted thereon a roller assembly 12c consisting of two sets 12d and 12e of rollers which are sloped to receive the pipe length in a manner substantially identical to other roller sets such as 83b which have been heretofore described. A hydraulic arm lift 105 is mounted in each of the sections 12a. The hydraulic arm lift 105 is basically identical to the hydraulic arm lift assemblies 73 and is provided at least in part to receive and cushion the receipt of a pipe length P onto the stations 12a.

Each of the sections 12a has mounted therewith a pipe transfer beam 106 which consists of two elongated tracks or beams 106a and 106b which are joined to receive a winch trolley 107. The beams 106a and 106b are pivotally mounted at 108 onto a pedestal 109 on the section base 12b and extend downwardly onto a roller support 110. The trolley 107 is suitably mounted to roll or slide along the beams 106a and 106b by means of a belt and pulley arrangement 111 which is just indicated schematically in FIG. 11b. It is understood that any suitable belt and pulley arrangement may be utilized to pull up the trolley 107. Each of the trolleys 107 includes a back support 107a which serves to support the pipe length P on the trolley 107 as it is pulled upwardly along the beams 106a and 106b onto the roller assemblies 12c. After the pipe length P has landed on the roller assemblies 12c of the pipe laying sections 12a, the pipe length P is joined to the already formed portion 14 of the pipeline in a manner known in the art.

Operation and Use

Assuming the vessel V is in the process of laying a pipeline and is actually already formed a portion 14 of an underwater pipeline, the operation and use of the pipe handling system H of the preferred embodiment of this invention will now be described. The overhead crane means 16 is moved along the main track portions 22a and 22b to a position over one of the pipe storage areas such as the aft storage area 10b in the hold 10. The lifting units 27 and 30 are then actuated to move along the fore and aft track sections 24a and 24b, respectively, to align the lifting units 27 and 30 with a pipe length P in the aft storage area 10b. The pipe P may, for some reason, be skewed such that the lifting units 27 and 30 will be independently moved to align themselves with the skewed pipe length P. Fluid pressure is then released on the hydraulic motors 54 of the lifting units 27 and 30 and the linkage 40 for each unit is allowed to lower by gravity downwardly to the pipe length P. A suitable gripping means such as the gripping means 41 is used to grip the pipe and the hydraulic motors 54 are then actuated to wind the wireline 55 onto the motor reel 54a thereby causing the cooperating lower pulley assembly 50 and upper pulley assembly 52 to raise upwardly with the pipe length P. It has been mentioned that one of the difficulties in handling such extremely large and heavy pipe lengths such as P is caused by the rocking motion of the boat due to wave action. The pipe lengths P are so large that great stresses are exerted on lifting equipment if the boat rocks during the lifting operations. The linkages 40 described herein are interconnected by suitable pins or bolts 45a to resist displacement of the attached pipe length P in spite of the rocking action of the boat. That is, the expandable linkages 40 including spaced linkages 42 and 43 serve to resist lateral or horizontal forces caused by tilting of the vessel and the pipe length P, due to the rocking motion of the vessel. The spaced but interconnected linkages 42 and 43 which form the expandable linkages 40 may also be described as expandable "scissor assemblies".

After the pipe length P has been raised to a position above the elevator stations 60 and 61, the main crane drive 31 is used to move the entire main frame unit 24 into the position shown in real lines in FIG. 1 where the forward track section 24a and the aft track section 24b are above the elevator stations 61 and 60, respectively. The lift units 27 and 30 are then actuated through the drive 39 to move along the fore and aft track sections 24a and 24b until the pipe length P is aligned directly over the elevator stations 61 and 60. The pipe length P is then lowered onto the elevator stations 61 and 60 and the entire overhead crane means 16 is moved to the position shown in imaginery lines in FIG. 1 so that the elevator stations can be actuated to raise the pipe length P through the hatch 11a and upwardly above the vessel deck 11.

The pipe transfer section 18c of the first conveyor means 18 is then used to transfer the pipe length P onto the conveyor section 18d. The hydraulic power cylinders 94a and 94b are actuated to move outwardly the movable frame 82 to a position wherein the roller assemblies 83a, 83b and 83c are positioned under the pipe length P supported on the elevator stations 61 and 62. The elevator stations 61 and 62 are then lowered and the pipe length P is allowed to settle onto the roller assemblies 83a, 83b and 83c, which are pivotally mounted in order to better conform to variations in the shape of the pipe length P. The hydraulic cylinders 94a and 94b are then contracted to move the movable frame 82 back into an aligned position with the other pipe conveying sections 18a, 18b and 18d. Suitable motor means such as 93 are then utilized to rotate rollers such as 89a and 89b to move the pipe length P onto the fore pipe conveying section 18d.

If desired, the pipe testing stations 74 in pipe conveying section 18d may be used to raise the pipe length P upwardly and then rotate the pipe length so that an inspector may determine if the pipe length P is in need of any repair prior to transfer onto the endless belt conveyor sections 96 and 97 of the second conveyor means 20.

The hydraulic arms lift assemblies 73 are actuated to raise the lift arms 73a upwardly until the pipe length P rolls onto the endless belt assemblies 98 and 102. The pipe length P is landed on the assemblies and held in position by the sloped, adjoining links such as 98b and 98c. The endless belt assemblies 98 and 102 are then actuated to move the pipe transversely in the direction of arrow 21, of the vessel V, from port to starboard, until the pipe P is landed onto the transfer beams 106. The trolleys 107 are then actuated through the winches 111 to pull the pipe P upwardly and land the pipe onto the roller assemblies 12c of the pipe laying stations 12a. The pipe is then attached by welding or other suitable means to the already formed pipeline portion 14. The vessel V is then moved forward sufficiently to allow the pipe laying station 12 to receive the next pipe length. This process is continually repeated until the pipeline is formed.

The foregoing disclosure and description of the invention are illustrative and explanatory thereof, and various changes in the size, shape and materials as well as in the details of the illustrated construction may be made without departing from the spirit of the invention.

I claim:

1. A pipe transfer system for transferring pipe from the hold of a vessel to the deck of said vessel and into position for attachment with an underwater pipeline, comprising:
   a pipe laying station positioned on the deck of said vessel for laying an underwater pipeline;
   overhead crane means mounted in said vessel hold for moving a pipe length from storage in said vessel hold to a position of alignment with a deck hatch;
   elevator means for receiving said pipe length from said overhead crane means and for moving said pipe length upwardly from said vessel hold to said vessel deck;
   first conveyor means mounted on said deck for receiving said pipe length from said elevator means and for moving said pipe length longitudinally of said vessel; and
   second conveyor means for receiving said pipe length from said first conveyor means and for moving said pipe transversely of said ship to said pipe laying station.

2. The system set forth in claim 1, where said first conveyor means includes:
   a roller track means extending longitudinally of said vessel for receiving said pipe length from said elevator means and moving said pipe length longitudinally of said vessel; and
   a pipe transfer section mounted for movement between a position in alignment with said roller for track means and a pick-up position outwardly of alignment with said roller track means for receiving said pipe length from said elevator means.

3. The structure set forth in claim 2, including:
   said pipe transfer section having a pivotally mounted roller track assemblies thereon for receiving and supporting said pipe length for movement into alignment with said roller track means.

4. The system set forth in claim 2, wherein said pipe transfer section includes:
   a stationary frame mounted on said vessel deck;
   a movable frame mounted for movement with respect to said stationary frame between a position of alignment with the remainder of said first conveyor means and a pickup position outwardly from said stationary frame; and
   means for supporting said movable frame in said pick-up position.

5. The system set forth in claim 2, including:
   said pipe transfer section being movable outwardly of the remainder of said first conveyor means to a pipe receiving position at said elevator station for picking up said pipe.

6. The system set forth in claim 1 wherein said second conveyor means includes:
   endless belt conveyor assemblies positioned to receive said pipe length from said first conveyor means; and
   each of said belt conveyor assemblies including an endless conveyor belt formed of pivotally interconnected links having mounted thereon pairs of sloped pipe receiving pods for receiving and supporting said pipe length for movement.

7. The system set forth in claim 1, wherein said first conveyor means includes:
   insepection means for lifting said pipe length to a raised position and for rotating said pipe for inspection purposes.

8. The system set forth in claim 1, including:
   said elevator means including elevator stations mounted in said vessel hold in position to receive said pipe length from said overhead crane means at approximately the end of said pipe length; and
   said first conveyor means mounted on said deck including a pipe transfer means for receiving said pipe from elevator stations in moving said pipe length into alignment with said first conveyor means.

* * * * *